(12) United States Patent
Ma (10) Patent No.: US 8,383,987 B2
(45) Date of Patent: Feb. 26, 2013

(54) WELDING CONTACT TIPS FOR PULSE APPLICATIONS

(75) Inventor: Tiejun Ma, Tecumseh (CA)

(73) Assignee: Illinois Tool Works Inc., Glenview, IL (US)

( * ) Notice: Subject to any disclaimer, the term of this patent is extended or adjusted under 35 U.S.C. 154(b) by 459 days.

(21) Appl. No.: 12/776,608

(22) Filed: May 10, 2010

(65) Prior Publication Data

US 2011/0073581 A1   Mar. 31, 2011

Related U.S. Application Data

(60) Provisional application No. 61/245,749, filed on Sep. 25, 2009.

(51) Int. Cl.
*B23K 9/28* (2006.01)
(52) U.S. Cl. .......... 219/137.61; 219/137.44; 219/137.52
(58) Field of Classification Search ............ 219/137.61, 219/137.44, 137.52
See application file for complete search history.

(56) References Cited

U.S. PATENT DOCUMENTS

| | | | |
|---|---|---|---|
| 3,502,841 A | 3/1970 | Heer | |
| 4,560,858 A | 12/1985 | Manning | |
| 4,733,052 A | 3/1988 | Nilsson et al. | |
| 5,556,562 A | 9/1996 | Sorenson | |
| 6,093,907 A * | 7/2000 | Hidaka | 219/137.61 |
| 6,200,519 B1 | 3/2001 | Wimroither | |
| 6,495,798 B1 * | 12/2002 | Enyedy | 219/137.62 |
| 6,710,300 B2 | 3/2004 | Steenis et al. | |
| 7,230,203 B2 * | 6/2007 | Wimroither et al. | 219/121.45 |
| 2004/0079741 A1 | 4/2004 | Keegan | |
| 2004/0188406 A1 | 9/2004 | Brabander | |
| 2008/0035623 A1 | 2/2008 | Hutchison | |
| 2008/0061050 A1 | 3/2008 | Walters | |

FOREIGN PATENT DOCUMENTS

| | | |
|---|---|---|
| DE | 19904348 A1 * | 8/2000 |
| JP | 61-115683 | 6/1986 |
| WO | 03/039800 | 5/2003 |

OTHER PUBLICATIONS

"Electrical Resistivity and Conductivity", Wikipedia, Retrieved from <URL: http://en.wikipedia.org/wiki/Electrical_resistivity_and_conductivity> [retrieved on Sep. 30, 2012]. The pertinent part is provided for reference to show conductivity of copper and tungsten.*
"Copper-Tungsten," Wikipedia, Retrieved from <URL: http://en.wikipedia.org/wiki/Copper-tungsten> [retrieved on Sep. 30, 2012]. The pertinent part is provided for reference to show conductivity and that copper tungsten is a metal matrix.*

(Continued)

*Primary Examiner* — Tuan T Nguyen
*Assistant Examiner* — Lance Reidlinger
(74) *Attorney, Agent, or Firm* — Fildes & Outland, P.C.

(57) ABSTRACT

A contact tip for a welding torch includes a body having a front discharge end, an opposite rear feed end, and a bore extending through the body. A cap is mounted on the body at the front end. The cap has an aperture generally aligned with the bore. The cap is composed of a material having an electrical conductivity between $1.74 \times 10^7$ and $4.35 \times 10^7$ Siemens per meter at 20° C. The body is composed of a material selected from the group consisting of copper and a copper alloy. The body has an electrical conductivity that is higher than the electrical conductivity of the cap. A portion of the bore at the front end of the body and at least a portion of the aperture in the cap define a contact area for a consumable electrode wire.

16 Claims, 8 Drawing Sheets

OTHER PUBLICATIONS

"ECKA DISCUP® -Neue Hochleistungskupferwerkstoffe" Hochschulkupfersymposium 2004 (translated: "ECKA DISCUP®—New High-Performance Copper Alloys," High Copper Symposium 2004), Retrieved from <URL: http://www.kupferinstitut.de/symposium/media/pdf/Cu-Werkstoffe%20durch%20PM.pdf> [retrieved on Sep. 30, 2012].*

Adam et al., "Contact Tube Temperature during GMAW," Welding Journal, pp. 37-41, vol. 80, No. 12, 2001.

Luijendijk, T. et al., "Calculation of the electrical resistance between contact tube and welding wire during GMA welding based on measurement of the contact force," Int. J. for the Joining of Materials, pp. 1-4, vol. 8(1), 1996.

Chandurkar, D. et al., "Experimental study of the effect of a contact conditioner on sliding electrical contacts," Proceedings of the 3rd Annual GRASP Symposium, pp. 211-212, Wichita State University, 2007.

Mohler, W. et al., "Contact tubes with improved characteristics—made of extruded composite materials," Welding & Cutting, pp. 214-216, vol. 53, No. 9, 2001.

Thier, H. et al., "Current contact tip life—Evaluation for different contact tip materials and shapes," Welding and Cutting, pp. 22-27, vol. 46, No. 5, 1995.

Shimizu, H. et al, "Wear mechanism in contact tube," Science and Technology of Welding and Joining, pp. 94-105, vol. 11, No. 1, 2006.

* cited by examiner

WELDING CONTACT TIPS FOR PULSE APPLICATIONS

CROSS REFERENCE TO RELATED APPLICATION

This application claims the priority of U.S. Provisional Application No. 61/245,749 filed Sep. 25, 2009.

TECHNICAL FIELD

This invention relates to contact tips for a GMAW (gas metal arc welding), MIG (metal inert gas), MAG (metal active gas), SAW (submerged arc welding), or FCAW (flux cored arc welding) welding torch, and more particularly to a contact tip having increased durability, especially in pulse welding applications.

BACKGROUND OF THE INVENTION

A conventional welding torch generally includes a cable assembly connected to a torch body, a gooseneck extending from the body, and a torch head at a distal end of the gooseneck. The torch head typically includes a retaining head and/or diffuser, a contact tip, and a nozzle. Welding wire (consumable electrode) and shielding gas are fed through the cable assembly and gooseneck to the torch head, where the welding wire and shielding gas are fed out of the contact tip.

Common metal welding techniques employ heat generated by electrical arcing to transition a portion of a workpiece to a molten state, and the addition of filler metal from the welding wire. Energy (e.g., welding current) is transferred from the cable assembly and gooseneck through the front components of the torch including the retaining head and contact tip, to the consumable electrode welding wire. When a trigger on the welding torch is operated or an "on" signal is assigned by a robot/automatic controller, electrode wire is advanced toward the contact tip, at which point current is conducted from the contact tip into the exiting welding wire. A current arc forms between the electrode wire and the workpiece, completing a circuit and generating sufficient heat to melt the electrode wire to form a weld with the workpiece. The shielding gas helps generate the arc and protects the weld. As the electrode wire is consumed and becomes a part of the weld, new electrode wire is advanced, continuously replacing the consumed electrode wire and maintaining the welding arc.

In order to increase welding speeds (e.g., the travelling speed) and to reduce spatter generation in welding applications, welding power sources have been utilizing modern waveforms that are represented by pulse and controlled short circuit. These waveforms typically use high peak current in a short pulse period and high current ramp rate. For example, 300 amp is usually regarded as a high current for 1.14 mm (0.045 inch) outer diameter (OD) solid steel electrode wire in constant voltage welding applications. In contrast, in pulse welding applications it is common for this same electrode wire to be welded at a peak current of 450 amps. This 50% higher current results in 125% more heat generation (in joules) at the contact tip-electrode wire interface, according to the rule $E=I^2RT$ where E represents heat in joules, I represents the current, R represents the electric resistance across the contact tip-electrode wire interface, and t represents a duration of time.

The high welding current and high current ramp rate transferring across the contact tip-electrode wire interface during pulse welding applications causes local melt or evaporation (e.g., arc erosion) on both the electrode wire and the contact tip. For example, burn marks form on the electrode wire as it is fed through the contact tip. This pattern of burn marks on the electrode wire is a characteristic feature of modern pulse waveform welding and is not seen on electrode wire fed through contact tips during constant voltage welding modes. Arc erosion during pulse welding applications causes substantial wear removal of the contact tip, and practical data indicates that contact tips deteriorate faster in pulse welding applications in comparison to constant voltage applications. As the peak welding current and current ramp rate in pulse welding applications are raised higher, the life span of the contact tip becomes shorter.

Figure 1:
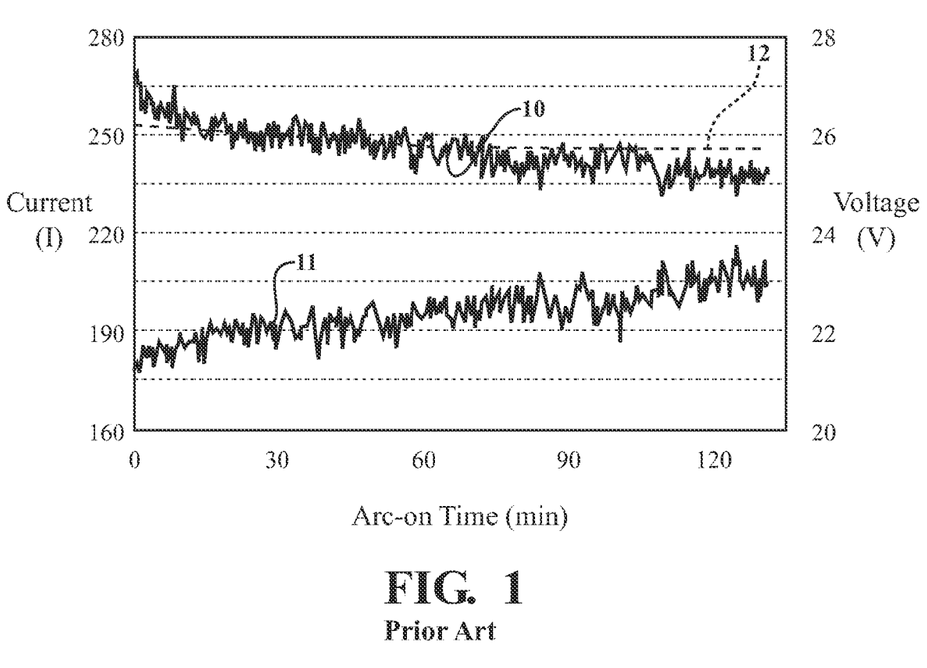
FIG. 1 is a graph of welding current and welding voltage versus time for a conventional contact tip in a pulse welding application.

The graph shown in FIG. 1 is a plot of the actual measured welding current 10 (in amps) and welding voltage 11 (in volts) of a contact tip with respect to time in a typical pulse welding application. The shape of the welding current curve 10 is common for a contact tip that has deteriorated over time. When a contact tip is new, the starting welding current is high and the starting welding voltage is low (see Arc-on time=0). As the contact tip deteriorates with use, the energy transfer efficiency across the interface of the contact tip and electrode wire decreases, resulting in a drop in welding current. Thus, the power source has to push with more electric force (i.e., higher welding voltage) to compensate for the drop in current caused by deterioration of the contact tip. When the current drops to a certain value, the energy consumption at the welding arc is insufficient to maintain proper melting of the electrode wire and a proper welding pool, resulting in an unstable arc and welding defects such as "skinny beads," "broken beads," and insufficient "leg length," "wetting," or "penetration." This is the most common failure mechanism for contact tips used in modern pulse or controlled short circuit welding processes, and requires replacement of the worn contact tip with a new contact tip to maintain production quality.

Further, with the development of high strength low alloy steels, the steel plate/sheet workpieces used today are significantly thinner than in the past. In order to not blow through these thin sheets, modern welding waveforms typically use a low energy input and produce a tightly controlled arc length. Thus, the welding parameters are set at the start of welding with a new contact tip so as to not exceed a certain level. Otherwise, welding defects such as "blow through" or "undercut" may occur. At the same time, the welding current must be kept above a lower threshold in order to maintain a stable arc. These requirements narrow down the acceptable window (upper max and lower min) of welding current that a contact tip must provide, also shortening the useful life of the contact tip.

While much effort has been put into improving the materials and design of welding torch contact tips to mitigate contact tip deterioration, almost none of this effort has focused on the deterioration mechanisms of the contact tip as a way to improve contact tip life. The two significant deterioration parameters for the contact tip are the starting welding current and the slope of the welding current curve over time. It is apparent that contact tip life can be significantly improved if the welding current curve can be adjusted to have a shape as shown by the dashed line 12. The hypothetical welding current curve 12 has a lower starting welding current when the contact tip is new (at time=0), and a smaller slope (absolute value of the slope of the curve) as the contact tip is used over time.

Figure 2A:
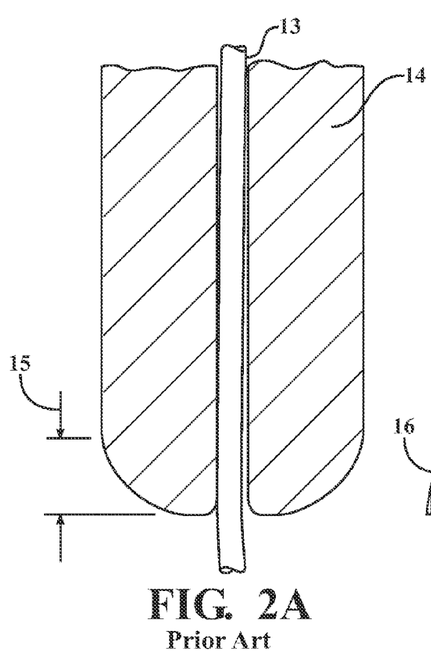
FIG. 2A is a schematic view of a consumable electrode wire fed through a new, barely used conventional contact tip.
Figure 2B:
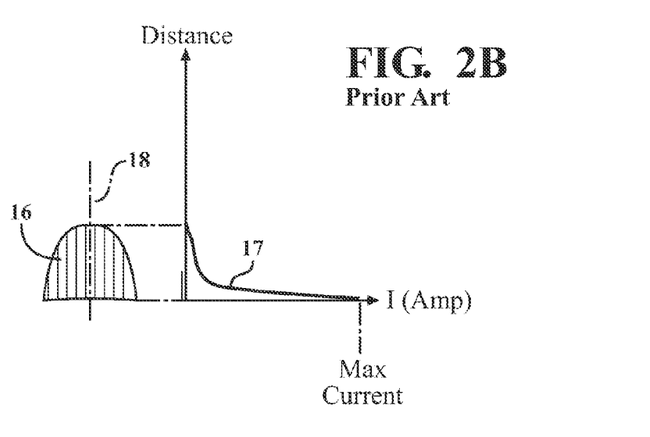
FIG. 2B is a schematic view of a contact area between the electrode wire and contact tip of FIG. 2A and the distribution of electric current along a center line of the contact area.
Figure 3A:
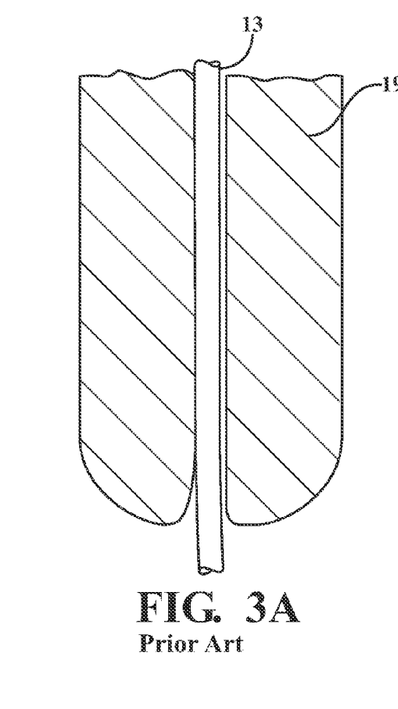
FIG. 3A is a schematic view of a consumable electrode wire fed through a used, worn conventional contact tip.
Figure 3B:
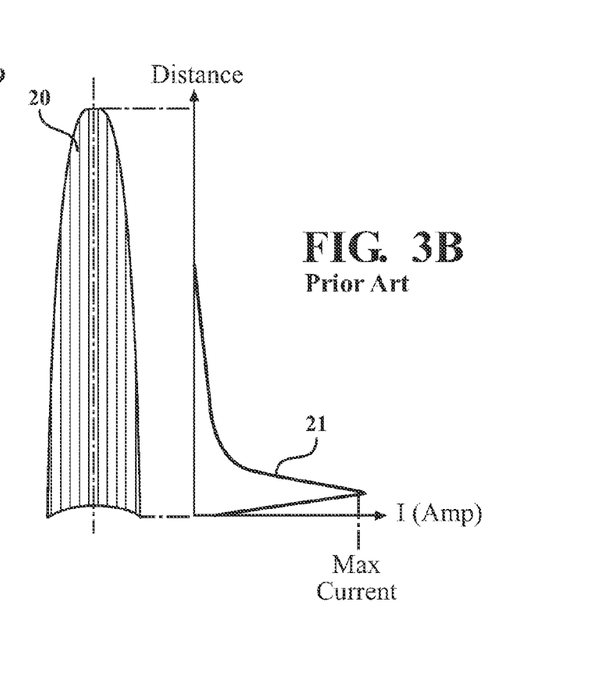
FIG. 3B is a schematic view of a contact area between the electrode wire and contact tip of FIG. 3A and the distribution of electric current along a center line of the contact area.

Further, an overlooked factor is the electrical resistance of copper (a common constituent of many contact tips) is lower than that of iron (commonly found in consumable electrode wires). Due to the difference in electrical resistance between these materials, the welding current tends to transfer from the contact tip to the electrode wire at the very end of the contact tip. As shown in FIG. 2A, the contour of an electrode wire 13 fed through a contact tip 14 is inclined due to the inherent cast (curvature) of the electrode wire, and the electrode wire contacts the contact tip at the very front end of the contact tip. This mechanical bend ensures electrical conduction between the electrode wire and the contact tip. Theoretically, the contact length 15 between the contact tip and electrode wire is zero (i.e., "point" contact) when the contact tip 14 is new, although in actuality the contact length has a small, non-zero value. FIG. 2B schematically shows the contact area 16 in the bore of the contact tip 14 and the distribution of welding current 17 along the center line 18 of the contact area 16. The distribution of welding current 17 peaks at the front end of the contact tip 14, where the electrical resistance is the lowest. In contrast, FIG. 3A depicts the contour of the electrode wire 13 through a used (i.e., worn) contact tip 19. As the front end of the contact tip 19 becomes damaged and/or "keyholed" by mechanical wear, arc erosion, and/or spatter impact, a large contact area 20 develops between the contact tip 19 and the electrode wire 13. As shown in FIG. 3B, the peak of the welding current 21 is recessed farther into the contact tip bore and is more diffusely spread along the contact tip.

The uneven distribution (i.e., peak at the front end of the contact tip) of the welding current occurs in both constant voltage and pulse welding processes. At the low welding currents used in constant voltage applications, this distribution does not cause noticeable damage, and has largely been ignored. However, in pulse welding applications, the high pulse welding current is enlarged by this distribution and causes significant damage to the front end of the contact tip. Thus, if the distribution of welding current across the contact area of the contact tip can be made more "even," the peak at the front end of the contact tip will be reduced, thereby reducing the deterioration rate of the contact tip.

SUMMARY OF THE INVENTION

The present invention provides a welding torch contact tip in which the welding current is split, varied, and spread along a front end length such that the contact tip generally has a lower maximum welding current as well as a lower decrease in welding current in relation to usage time (i.e., "arc-on" time), and therefore a lower deterioration rate. The present contact tip generally includes a contact tip body and a contact tip cap mounted on a front end of the body. The cap provides a portion of the contact area between the electrode wire and the contact tip during at least most of the useful lifespan of the contact tip.

More particularly, a contact tip for a welding torch in accordance with the present invention includes a body having a front discharge end, an opposite rear feed end, and a bore extending through the body. A cap is mounted on the body at the front end. The cap has an aperture generally aligned with the bore. The cap is composed of a material having an electrical conductivity between $1.74 \times 10^7$ and $4.35 \times 10^7$ Siemens per meter at 20° C. The body is composed of a material selected from the group consisting of copper and a copper alloy. The body has an electrical conductivity that is higher than the electrical conductivity of the cap, i.e., the body may have an electrical conductivity of no less than $4.35 \times 10^7$ Siemens per meter at 20° C. A portion of the bore at the front end of the body and at least a portion of the aperture in the cap define a contact area for a consumable electrode wire.

The cap may be composed of a copper metal matrix composite. The copper metal matrix composite may be one of a ceramic reinforced copper and a ceramic reinforced copper alloy. A ceramic reinforcement material in the copper metal matrix composite may be in the form of a porous structure, particles, fibers, flakes, or a mixture of one or more of particles, fibers, and flakes.

The aperture in the cap may have a length of approximately 3 to 7 mm. The cap may be mounted on the body by one of pressing, forging, soldering, brazing, crimping, and threading.

Alternatively, the cap may include more than one layer. Each layer may have a thickness of up to approximately 4 mm. The aperture in the cap may have a length of approximately 17 mm or less. The cap may have an electrical conductivity that varies stepwise between adjacent layers.

Alternatively, the cap may be integrated into the body. The cap may be a gradient composite material, and the electrical conductivity of the cap may decrease from the front end of the body to a front end of the cap. The cap may have a thickness of approximately 1 to 17 mm.

Alternatively, the cap may be an insert mounted in the bore at the front end of the body.

In another embodiment, a welding torch assembly in accordance with the present invention includes a torch body, a neck extending from a forward end of the torch body, a retaining head mounted on a distal end of the neck, and a contact tip mounted on the retaining head. The contact tip includes a body having a front discharge end, an opposite rear feed end, and a bore extending through the body. A cap is mounted on the body at the front end. The cap has an aperture generally aligned with the bore. The cap is composed of a material having an electrical conductivity between $1.74 \times 10^7$ and $4.35 \times 10^7$ Siemens per meter at 20° C. The body is composed of a material selected from the group consisting of copper and a copper alloy. The body has an electrical conductivity that is higher than the electrical conductivity of the cap, i.e., the body may have an electrical conductivity of no less than $4.35 \times 10^7$ Siemens per meter at 20° C. A portion of the bore at the front end of the body and at least a portion of the aperture in the cap define a contact area for a consumable electrode wire.

The cap may be composed of a copper metal matrix composite. The copper metal matrix composite may be one of a ceramic reinforced copper and a ceramic reinforced copper alloy. A ceramic reinforcement material in the copper metal matrix composite may be in the form of a porous structure, particles, fibers, flakes, or a mixture of one or more of particles, fibers, and flakes.

These and other features and advantages of the invention will be more fully understood from the following detailed description of the invention taken together with the accompanying drawings.

DETAILED DESCRIPTION OF THE INVENTION

Figure 4:
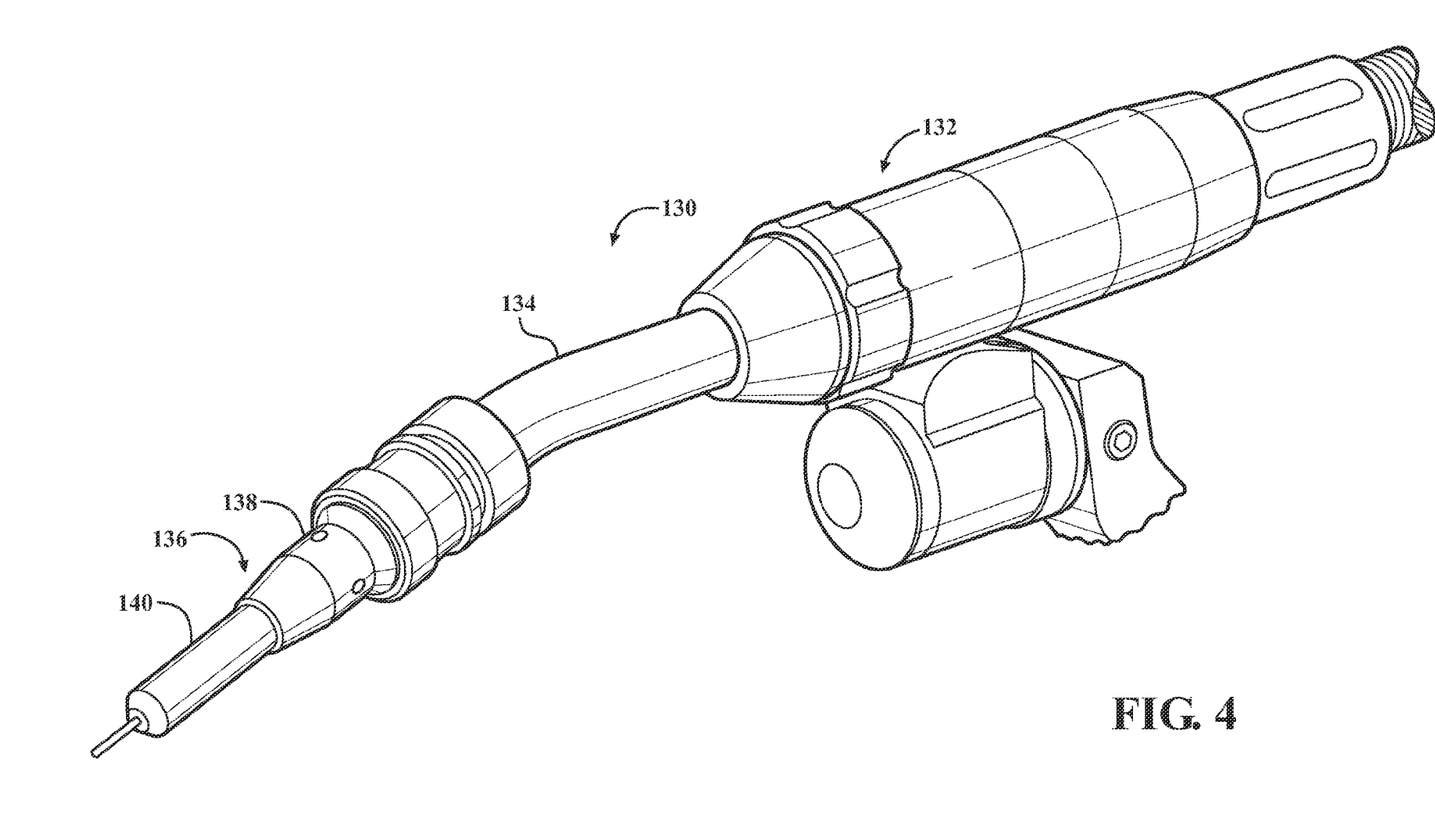
FIG. 4 is a perspective view of a front end of a welding torch including a contact tip in accordance with the present invention.

Referring now to the drawings in detail, numeral 130 generally indicates a welding torch such as a gas metal arc welding (GMAW) torch or a similar welding torch. As shown in FIG. 4, the welding torch 130 broadly includes a torch body 132, a neck such as a gooseneck 134 extending from a forward end of the torch body, and a contact tip assembly 136 at a distal end of the gooseneck. The contact tip assembly 136 generally includes a retaining head 138 and contact tip 140, which is discussed in greater detail below. During use of the welding torch 130, the contact tip assembly 136 may be covered and protected by a nozzle. A cable (not shown) is connected to a rear end of the torch body 132. The cable supplies electrical current, shielding gas, and a consumable electrode wire (e.g., a metal welding wire) to the torch body 132. The electrode wire travels through the torch body 132 to the gooseneck 134 and ultimately exit through an orifice in the contact tip assembly 136.

The welding wire, when energized for welding, carries a high electrical potential. When the welding wire approaches or makes contact with target metal workpieces, an arc is generated and an electrical circuit is completed and current flows through the welding wire, across the metal workpieces and to the ground. The current and the arc cause the welding wire and the parent metal of the workpieces in contact with the welding wire to melt, thereby joining the workpieces as the melt solidifies.

Figure 5A:
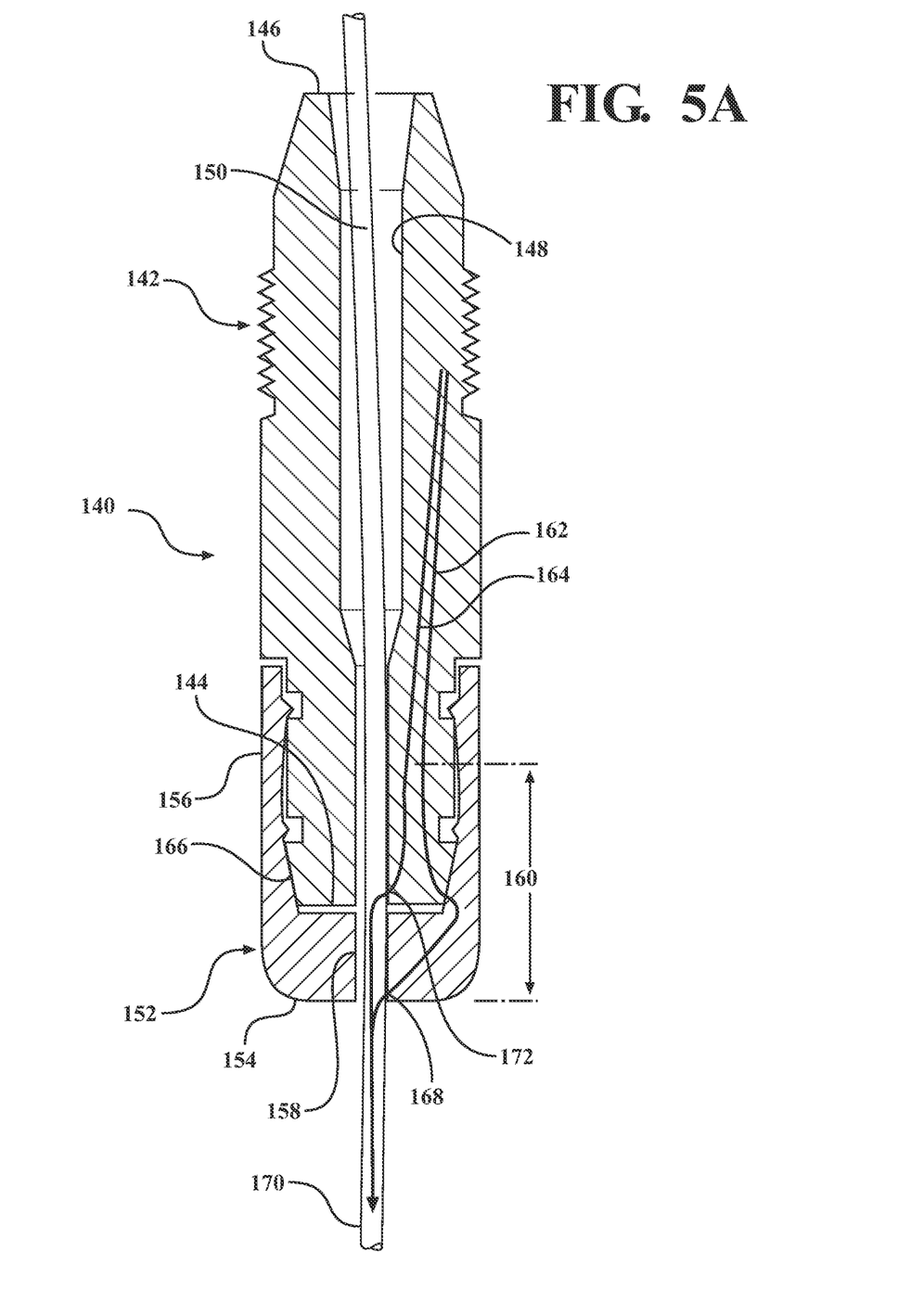
FIG. 5A is a sectional view of a contact tip in accordance with the present invention.

Turning to FIG. 5A, a contact tip 140 in accordance with the invention includes a body 142 that may be elongated and generally cylindrical, although the body is not limited to any specific shape. The body 142 has a front discharge end 144 and an opposite rear feed end 146. The rear end 146 portion of the body may include threads or other similarly suitable mounting feature for installing the contact tip 140 in the retaining head. A bore 148 extends through the body 142 from the rear end 146 to the front end 144. The contour of the bore 148 is not limited to any particular shape or dimensions. However, the bore 148 typically has a narrow (i.e., small diameter) front portion having a diameter that is slightly larger than the diameter of a consumable electrode welding wire 150 fed through the contact tip 140 during use of the welding torch.

A cap 152 is mounted on the body 142 at the front end 144 by pressing, forging, crimping, soldering, or brazing the cap onto the body. Alternatively, the cap 152 may include mounting means such as threads (e.g., standard threads, Acme threads, etc.) or similar for connecting the cap to the body 142. The cap 152 may include a head 154 and a sidewall 156 extending from the head. The head 154 may be generally circular in shape and has an aperture 158 extending therethrough which is generally aligned with the bore 148 in the body 142. The aperture 158 may have a length of approximately 3 to 7 mm. In this case, the head 154 has a thickness between 3 and 7 mm.

The cap 152 is composed of a material having an electrical conductivity between $1.74 \times 10^7$ and $4.35 \times 10^7$ Siemens per meter at 20° C., i.e., between 30% and 75% IACS (International Annealed Copper Standard) at 20° C., wherein an IACS value of 100% refers to a conductivity of $5.80 \times 10^7$ Siemens per meter at 20° C. The cap may be composed of a copper metal matrix composite material. For example, the cap may be made of a ceramic reinforced copper or ceramic reinforced copper alloy. The ceramic reinforcements in the ceramic reinforced copper/copper alloy may be in the form of a porous structure, particles, fibers, flakes, or a mixture of one or more of particles, fibers, and flakes.

The body 142, on the other hand, is composed of either copper or a copper alloy, and the material forming the body has an electrical conductivity that is higher than the electrical conductivity of the cap. For example, the body may have an electrical conductivity of no less than $4.35 \times 10^7$ Siemens per meter at 20° C., i.e., no less than 75% IACS at 20° C.

A portion of the bore 148 at the front end 144 of the body 142 and at least a portion of the aperture 158 in the cap 152 define a contact area 160 for the consumable electrode wire 150 such that the consumable electrode wire fed through the contact tip 140 simultaneously contacts both the body 142 and the cap 152 during a useful lifespan of the contact tip, and thus welding current transfers from the contact tip to the electrode wire through more than one material.

Figure 5B:
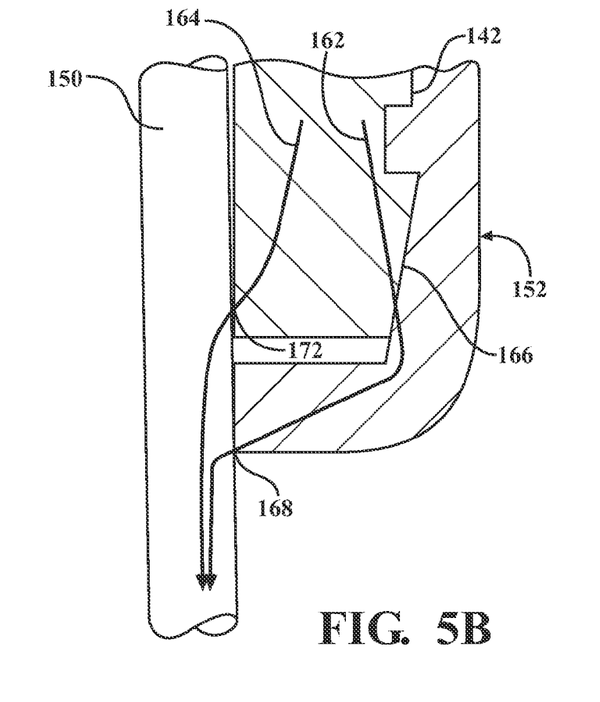
FIG. 5B is an enlarged, schematic view of current pathways through the contact tip of FIG. 5A and an electrode wire.

As shown in FIGS. 5A and 5B, electric current generally travels along two paths 162, 164 from the contact tip 140 to the consumable electrode wire 150. The first path 162 starts from the back of the contact tip body 142, runs through the body and across an interface 166 between the body and the contact tip cap 152, passes through the cap and across a front end point 168 of the contact area 160 between the cap and the electrode wire 150, to a front end 170 of the electrode wire. The interface 166 between the contact tip body 142 and the contact tip cap 152 is preferably distal from the interface of the contact tip 140 with the electrode wire 150. This assures that the electrical contact between the body 142 and cap 152 is spaced from the welding arc during use of the welding torch. The second path 164 starts from the back of the contact tip body 142, runs through the body and across a front end point 172 of the contact area 160 between the body and the electrode wire 150, to the front end 170 of the electrode wire. The first and second paths 162, 164 generally begin and end in the same location but otherwise diverge in travelling from the contact tip 140 to the electrode wire 150.

Figure 5C:
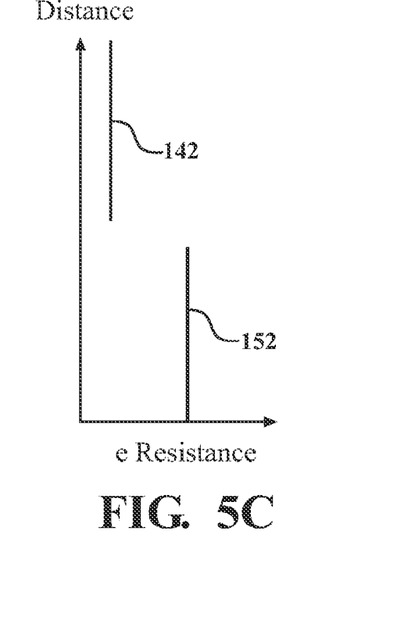
FIG. 5C is a graph of the electrical resistivity of the current pathways of FIG. 5B.

As shown in FIGS. 5B and 5C, the electrical resistance through the contact tip cap 152 is greater than the electrical resistance through the contact tip body 142. As shown in FIG.

Figure 5D:
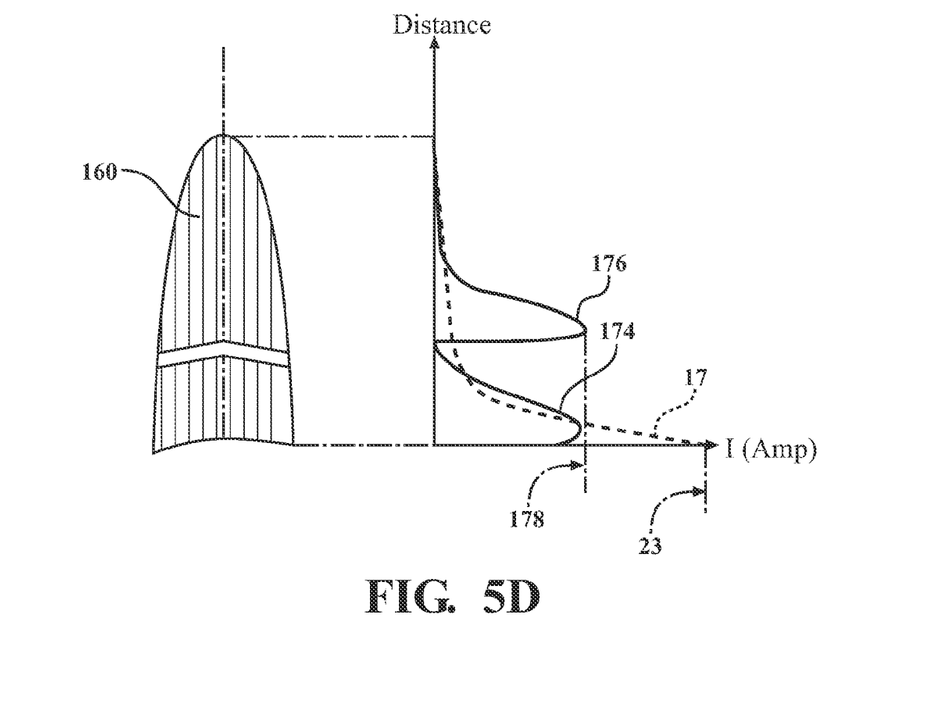
FIG. 5D is a schematic view of a contact area between the electrode wire and contact tip of FIG. 5B and the distribution of electric current along a center line of the contact area.

5D, the welding current splits roughly in half between the contact tip body 142 and contact tip cap 152, and peaks on both the first path 162 and second path 164 at the respective interface points 168, 172 with the electrode wire 150. The first peak 174 in the first path 162 is generally equal in magnitude with the second peak 176 in the second path 164. The welding current 17 of a conventional contact tip is superimposed on the graph in dashed line (based on the assumption that the same amount of energy is transferred from the contact tip to the electrode wire along both current paths). It is apparent that the maximum value 178 of the welding current of the contact tip 140 according to the present invention is significantly lower than the maximum value 23 of the welding current through the conventional contact tip. Due to the lower maximum welding current in the present contact tip 140 in comparison to conventional contact tips, the welding current versus arc-on time curve is more flat (i.e., horizontal) such as the hypothetical curve 12 shown in FIG. 2. In other words, the decrease in slope of the welding current with respect to time is milder (lower) for the present contact tip 140, and thus the deterioration rate of the contact tip 140 is lower, thereby extending the useful life of the contact tip.

Figure 6A:
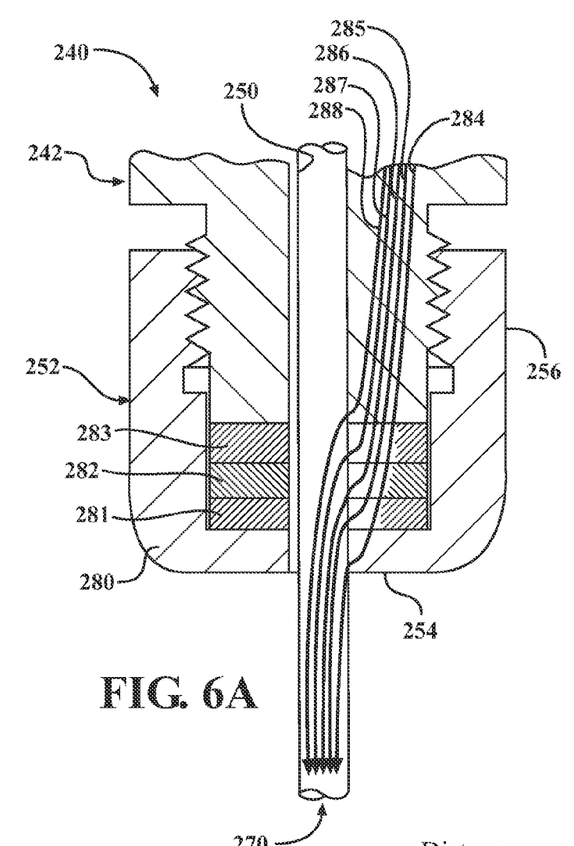
FIG. 6A is an enlarged, schematic view of current pathways through a contact tip in accordance with the present invention and an electrode wire.

In another embodiment shown in FIG. 6A, the contact tip cap 252 of the contact tip 240 may include a plurality of layers. In the embodiment shown, the cap 252 has four layers 280, 281, 282, 283. The first layer 280 is generally formed by the head 254 of the contact tip cap 252, and the second, third, and fourth layers 281, 282, 283 may be conductive sheets, plates, or similar that are disposed within the sidewall 256 of the cap 252 between the head 254 and the contact tip body 242. The layers 281, 282, 283 may be made from the same material as the contact tip cap 252, or they may be made out of different materials than the cap such as another copper alloy or similar material having an electrical conductivity between that of the cap 252 and that of the body 242. In other words, the layers 280, 281, 282, 283 all may be made of the same material, or the layers may be made of various materials such each of the layers is made of a material that is different than some or all of the other layers. Thus, the electrical conductivities of the layers may vary stepwise between adjacent layers. For example, the electrical conductivities of the layers may increase from the front end of the tip towards the back end. The outermost layer (i.e., towards the front) may have the lowest conductivity, and the innermost layer may have the highest conductivity which is closest in conductivity to that of the contact tip body. Each of the layers may have a thickness of approximately 1.5 to 3 mm such that the total thickness of a contact area between the contact tip 240 and an electrode wire is up to approximately 17 mm.

In this embodiment, electric current generally travels along five paths 284, 285, 286, 287, 288 from the contact tip 240 to the consumable electrode wire 250. The first path 284 starts from the back of the contact tip body 242, runs through the body and across an interface between the body and the contact tip cap 252, passes through the cap and across a front end point of a contact area between the first layer 280 of the cap and the electrode wire 250, to a front end 270 of the electrode wire. The second path 285 starts from the back of the contact tip body 242, runs through the body and across an interface between the body and the contact tip cap 252, passes through the cap and across a front end point of a contact area between the second layer 281 of the cap and the electrode wire 250, to the front end 270 of the electrode wire. The third path 286 starts from the back of the contact tip body 242, runs through the body and across an interface between the body and the contact tip cap 252, passes through the cap and across a front end point of a contact area between the third layer 282 of the cap and the electrode wire 250, to the front end 270 of the electrode wire. The fourth path 287 starts from the back of the contact tip body 242, runs through the body and across an interface between the body and the contact tip cap 252, passes through the cap and across a front end point of a contact area between the fourth layer 283 of the cap and the electrode wire 250, to the front end 270 of the electrode wire. The fifth path 288 starts from the back of the contact tip body 242, runs through the body and across a front end point of a contact area between the body and the electrode wire 250, to the front end 270 of the electrode wire. The paths 284, 285, 286, 287, 288 generally begin and end in the same location but otherwise diverge in travelling from the contact tip 240 to the electrode wire 250.

Figure 6B:
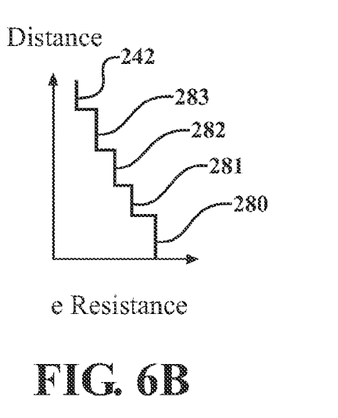
FIG. 6B is a graph of the electrical resistivity of the current pathways of FIG. 6A.
Figure 6C:
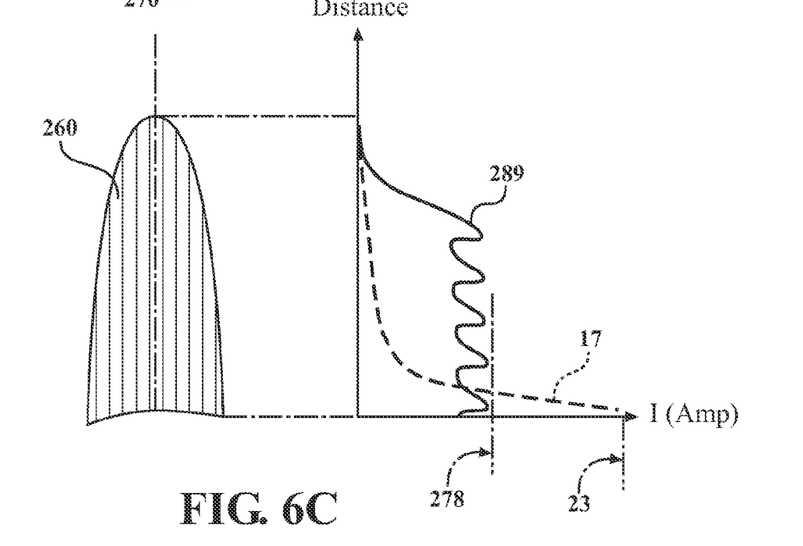
FIG. 6C is a schematic view of a contact area between the electrode wire and contact tip of FIG. 6A and the distribution of electric current along a center line of the contact area.

As shown in FIG. 6B, the electrical resistance increases stepwise from the contact tip body 242 to the four layers 280, 281, 282, 283. Further, the electrical resistances of the five current paths 284, 285, 286, 287, 288 are generally equal to or similar to each other at the front end 270 of the electrode wire 250. Also, as the welding current travels from the contact tip cap layer 283 close to the contact tip body 242 to the layers 280, 281, 282 at the front end of the contact tip cap 252, the electrical resistances from the interfaces between the layers generally accumulate and dissipate the welding current to the electrode wire 250 in an approximately equal amount along the contact area 260 between the tip 240 and the electrode wire. Thus, as shown in FIG. 6C, the distribution of welding current 289 along a center line of the contact area 260 is a wave curve, and the maximum welding current 278 of the contact tip 240 according to the present invention is significantly lower than the maximum value 23 of the welding current 17 through a conventional contact tip.

Figure 7A:
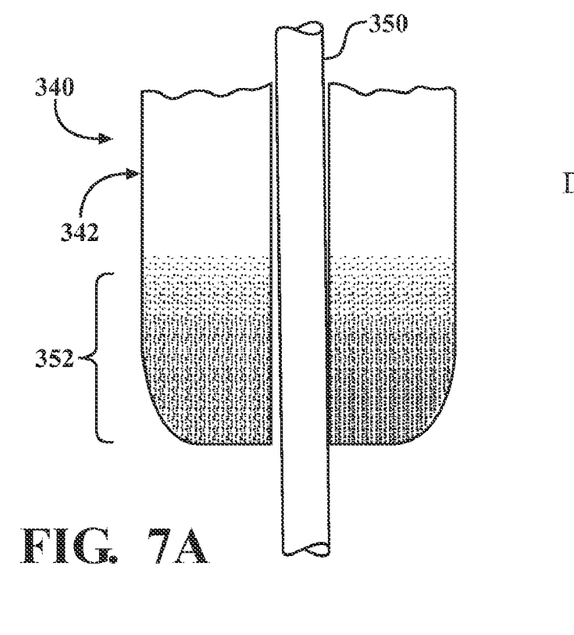
FIG. 7A is an enlarged, schematic view of a contact tip in accordance with the present invention and an electrode wire.
Figure 7B:
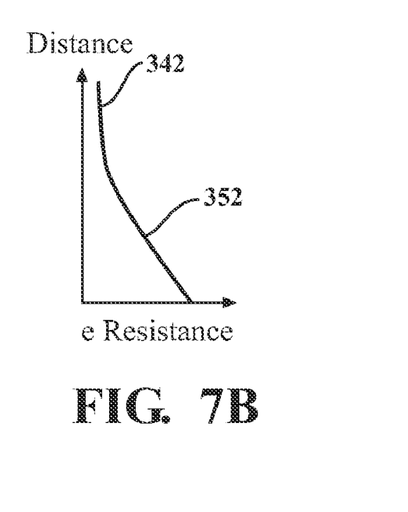
FIG. 7B is a graph of the electrical resistivity of the contact tip.
Figure 7C:
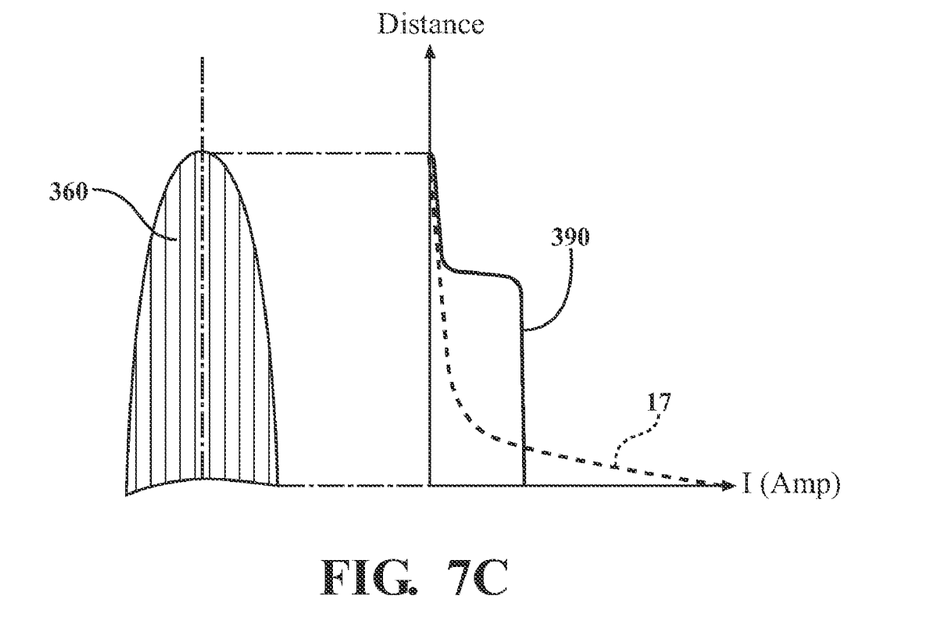
FIG. 7C is a schematic view of a contact area between the electrode wire and contact tip of FIG. 7A and the distribution of electric current along a center line of the contact area.

In another embodiment shown in FIG. 7A, the contact tip cap 352 of the contact tip 340 may be a gradient composite material integrated into the contact tip body 342. The contact tip cap 352 formed of the gradient composite material may have a thickness (i.e., length along the axis of the contact tip 340) of up to approximately 17 mm, which is the effective length of the contact area between the contact tip 340 and electrode wire 350. The "gradient composite material" is one in which the composition varies from one end of the member to an opposite end. For example, the composition of the cap 352 varies from an end adjacent the body 342 to an opposite front end of the contact tip 340 such that the electrical resistance of the cap increases towards the front end of the contact tip as shown in FIG. 7B. Thus, the welding current distribution 390 along a center line of the contact area 360 forms a generally flat line having a maximum welding current that is significantly lower than the welding current 17 through a conventional contact tip, as shown in FIG. 7C.

Figure 8:
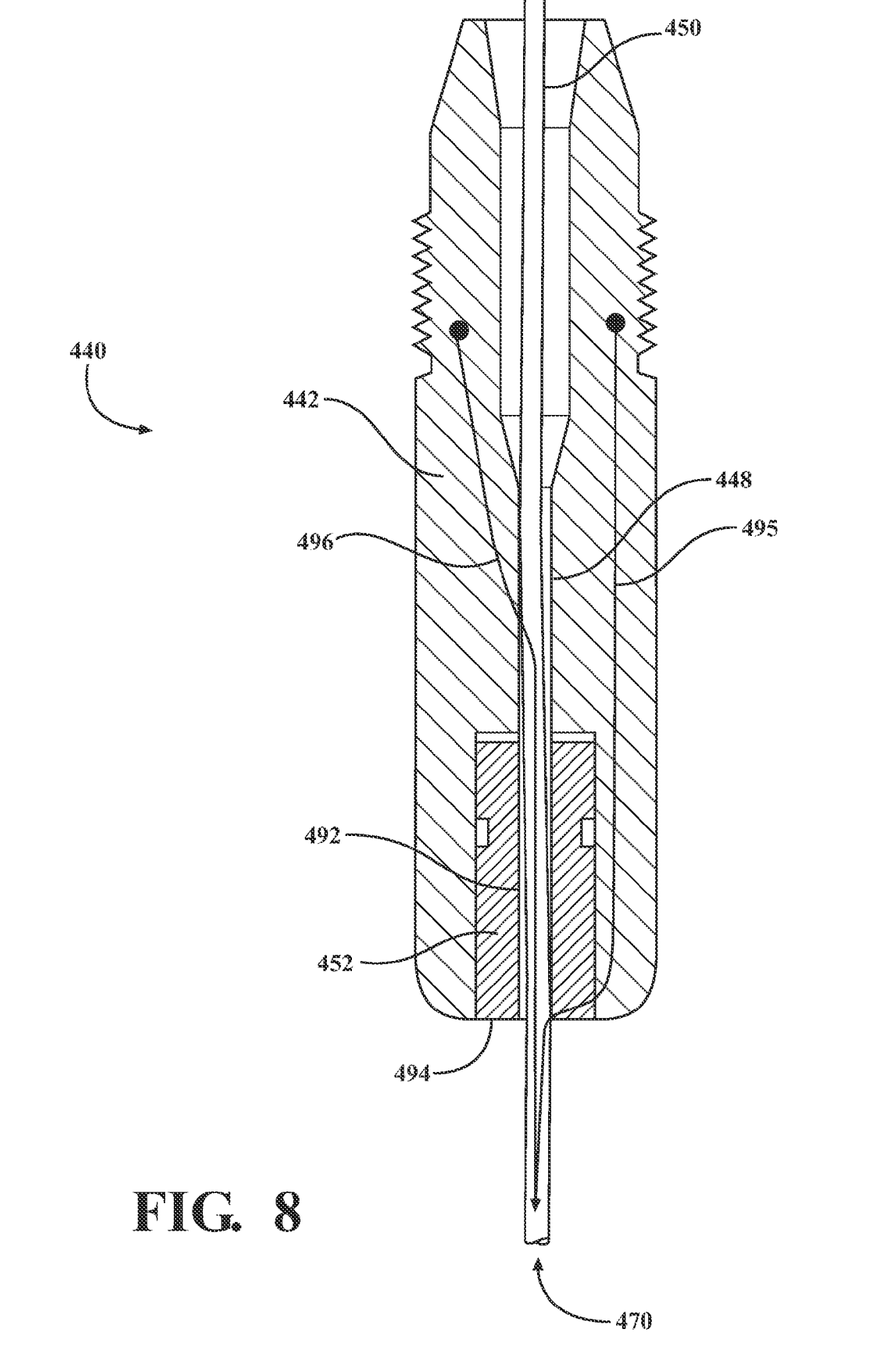
FIG. 8 is a sectional view of a contact tip in accordance with the present invention.

In yet another embodiment shown in FIG. 8, the contact tip cap 452 of the contact tip 440 may be an insert mounted in a widened portion of the bore 448 of the contact tip body 442. The cap 452 includes an aperture 492 that is generally coaxial with the bore 448. An electrode wire fed 450 fed through the contact tip 440 passes through the bore 448 and aperture 492 and exits a front end 494 of the cap 452. Electric current generally travels along two paths 495, 496 from the contact tip 440 to the consumable electrode wire 450. The first path 495 starts from the back of the contact tip body 442, runs through the body and across an interface between the body and the contact tip cap 452, passes through the cap and across a front end point of the contact area between the cap and the electrode wire 450, to a front end 470 of the electrode wire. The second path 496 starts from the back of the contact tip body 442, runs through the body and across a front end point of the contact area between the body and the electrode wire 450, to the front end 470 of the electrode wire. Similar to the previous embodiments, the same general principle applies to this embodiment 440: in the contact tip, the electrode wire 450 touches, and current transfers through, more than one material (having differing conductivity/resistance) during the majority of the service life span (i.e., useful life) of the contact tip. Therefore, the peak welding current through the contact tip 440 is lowered, and the deterioration rate of the contact tip consequently decreases.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A contact tip for a welding torch, the contact tip comprising:
    a body having a front discharge end, an opposite rear feed end, and a bore extending through said body; and
    a cap mounted on said body at said front end, said cap having an aperture generally aligned with said bore;
    said cap being composed of a material having an electrical conductivity between $1.74 \times 10^7$ and $4.35 \times 10^7$ Siemens per meter at 20° C.;
    said body being composed of a material selected from the group consisting of copper and a copper alloy, said body having an electrical conductivity that is higher than the electrical conductivity of said cap;
    wherein a portion of said bore at the front end of said body and at least a portion of said aperture in said cap define a contact area for a consumable electrode wire, said cap is integrated into said body, said cap is a gradient composite material, and the electrical conductivity of said cap decreases from the front end of said body to a front end of said cap.

2. The contact tip of claim 1, wherein said cap is composed of a copper metal matrix composite.

3. The contact tip of claim 2, wherein the copper metal matrix composite is one of a ceramic reinforced copper and a ceramic reinforced copper alloy.

4. The contact tip of claim 3, wherein a ceramic reinforcement material in the copper metal matrix composite is in the form of one selected from the group consisting of a porous structure, particles, fibers, flakes, and a mixture of one or more of particles, fibers, and flakes.

5. The contact tip of claim 1, wherein said body has an electrical conductivity of no less than $4.35 \times 10^7$ Siemens per meter at 20° C.

6. The contact tip of claim 1, wherein the aperture in said cap has a length of approximately 3 to 7 mm.

7. The contact tip of claim 1, wherein said cap includes more than one layer.

8. The contact tip of claim 7, wherein each layer has a thickness of up to approximately 4 mm.

9. The contact tip of claim 7, wherein the aperture in said cap has a length of approximately 17 mm or less.

10. The contact tip of claim 7, wherein said cap has an electrical conductivity that varies stepwise between adjacent said layers.

11. The contact tip of claim 1, wherein said cap has a thickness of up to approximately 17 mm.

12. A welding torch assembly comprising:
    a torch body;
    a neck extending from a forward end of said torch body;
    a retaining head mounted on a distal end of said neck; and
    a contact tip mounted on said retaining head;
    said contact tip including:
        a body having a front discharge end, an opposite rear feed end, and a bore extending through said body; and
        a cap mounted on said body at said front end, said cap having an aperture generally aligned with said bore;
        said cap being composed of a material having an electrical conductivity between $1.74 \times 10^7$ and $4.35 \times 10^7$ Siemens per meter at 20° C.;
        said body being composed of a material selected from the group consisting of copper and a copper alloy, said body having an electrical conductivity that is higher than the electrical conductivity of said cap;
        wherein a portion of said bore at the front end of said body and at least a portion of said aperture in said cap define a contact area for a consumable electrode wire, said cap is integrated into said body, said cap is a gradient composite material, and the electrical conductivity of said cap decreases from the front end of said body to a front end of said cap.

13. The welding torch assembly of claim 12, wherein said cap is composed of a copper metal matrix composite.

14. The contact tip of claim 13, wherein the copper metal matrix composite is one of a ceramic reinforced copper and a ceramic reinforced copper alloy.

15. The welding torch assembly of claim 14, wherein a ceramic reinforcement material in the copper metal matrix composite is in the form of one selected from the group consisting of a porous structure, particles, fibers, flakes, and a mixture of one or more of particles, fibers, and flakes.

16. The welding torch assembly of claim 12, wherein said body has an electrical conductivity of no less than $4.35 \times 10^7$ Siemens per meter at 20° C.

* * * * *